United States Patent
Chen et al.

(10) Patent No.: US 12,518,007 B2
(45) Date of Patent: Jan. 6, 2026

(54) HYBRID DATA SCAN PIPELINE REDUCING RESPONSE LATENCY AND INCREASING ATTACK SCANNING ACCURACY

(71) Applicant: Red Hat, Inc., Raleigh, NC (US)

(72) Inventors: Huamin Chen, Westboro, MA (US); Yuval Lifshitz, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 348 days.

(21) Appl. No.: 17/681,144

(22) Filed: Feb. 25, 2022

(65) Prior Publication Data

US 2023/0273995 A1    Aug. 31, 2023

(51) Int. Cl.
*G06F 21/56* (2013.01)

(52) U.S. Cl.
CPC ...... *G06F 21/561* (2013.01); *G06F 2221/034* (2013.01)

(58) Field of Classification Search
CPC ...... G06F 21/56; G06F 21/561; G06F 21/566; G06F 21/562; G06F 21/563; G06F 21/55; G06F 21/554; G06F 21/565; G06F 21/6218; G06F 2221/034; H04L 63/14; H04L 63/1408; H04L 63/1416; H04L 63/1425

See application file for complete search history.

(56) References Cited

U.S. PATENT DOCUMENTS

| | | | |
|---|---|---|---|
| 8,973,135 B2 | 3/2015 | Francis et al. | |
| 9,575,828 B2 | 2/2017 | Agarwal et al. | |
| 9,609,015 B2 | 3/2017 | Natarajan et al. | |
| 11,178,172 B2 | 11/2021 | Hittel et al. | |
| 2006/0026154 A1* | 2/2006 | Altinel | G06F 16/24552 707/999.005 |
| 2011/0099635 A1* | 4/2011 | Silberman | G06F 21/562 706/46 |
| 2016/0292419 A1* | 10/2016 | Langton | G06F 21/567 |
| 2017/0004306 A1* | 1/2017 | Zhang | G06F 21/562 |

(Continued)

OTHER PUBLICATIONS

Netskope, "Configure Threat Protection for a Real-time Protection Policy," https://docs.netskope.com/en/configure-threat protection-for-a-real-time-protection-policy.html, Oct. 7, 2021, 2 pages.

(Continued)

*Primary Examiner* — Jeremy S Duffield
(74) *Attorney, Agent, or Firm* — Womble Bond Dickinson (US) LLP

(57) ABSTRACT

Methods, systems, and computer program products provide a hybrid data scan pipeline or detector that reduces (as compared to conventional storage operations) response latency and increases scanning accuracy of encryption attacks such as ransomware attacks. For example, a frontend of a storage platform receiving an incoming data object may scan a portion of the data object for a change of an entropy level. The portion scanned may be insignificant relative to the overall size of the data object. As such, the operations of the frontend would place an insignificant delay to the overall storage processing. Other portions of the data object will be processed at a backend of the storage platform. For example, subsequent to receiving the data object, a change of entropy level of the other portions is scanned for detecting ransomware attacks.

17 Claims, 6 Drawing Sheets

(56) References Cited

U.S. PATENT DOCUMENTS

| | | | |
|---|---|---|---|
| 2017/0024276 A1* | 1/2017 | Kanno | G06F 11/1008 |
| 2018/0007069 A1 | 1/2018 | Hunt et al. | |
| 2018/0048658 A1* | 2/2018 | Hittel | G06F 21/565 |
| 2018/0212987 A1* | 7/2018 | Tamir | G06F 11/1461 |
| 2019/0034295 A1* | 1/2019 | Bourgeois | G06F 16/125 |
| 2019/0129888 A1* | 5/2019 | Bowman | G06F 3/0604 |
| 2019/0319987 A1* | 10/2019 | Levy | H04L 63/08 |
| 2020/0304539 A1* | 9/2020 | Chen | H04L 63/1425 |
| 2020/0351277 A1* | 11/2020 | Dhanabalan | H04L 63/1416 |
| 2021/0021611 A1 | 1/2021 | Hewlett, II et al. | |
| 2023/0247048 A1* | 8/2023 | Samosseiko | H04L 63/1425 726/23 |
| 2023/0308460 A1* | 9/2023 | Thomas | H04L 63/102 |

OTHER PUBLICATIONS

Google Cloud, "Automating Malware Scanning for Documents Uploaded to Cloud Storage," Cloud Architecture Center, https://cloud.google.com/architecture/automating-malware-scanning-for-documents-uploaded-to-cloud-storage, Oct. 10, 2021, 14 pages.

Davies, Simon R., et al., "Differential Area Analysis for Ransomware Attack Detection within Mixed File Dataset," School of Computing, Edinburgh Napier University, Edinburgh, UK, Jun. 28, 2021, 13 pages.

* cited by examiner

HYBRID DATA SCAN PIPELINE REDUCING RESPONSE LATENCY AND INCREASING ATTACK SCANNING ACCURACY

TECHNICAL FIELD

Aspects of the present disclosure relate to storage platforms, and more particularly, to detecting attacks in storage platforms.

BACKGROUND

Data services are expected to have a low response latency, which may be achieved by reduced data movement (e.g., accessed at a location close to where the data is stored). Often, operations of privacy preservation and attack detection (e.g., ransomware scanning) are instrumented in the computational storage backend, to ensure the persisted data are in compliance with local regulations. This way, however, may result in detecting an attack too late, or otherwise causing substantial delay in operation when the data are scanned at a bottleneck.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the scope of the described embodiments.

Like numerals indicate like elements.

DETAILED DESCRIPTION

Figure 1:
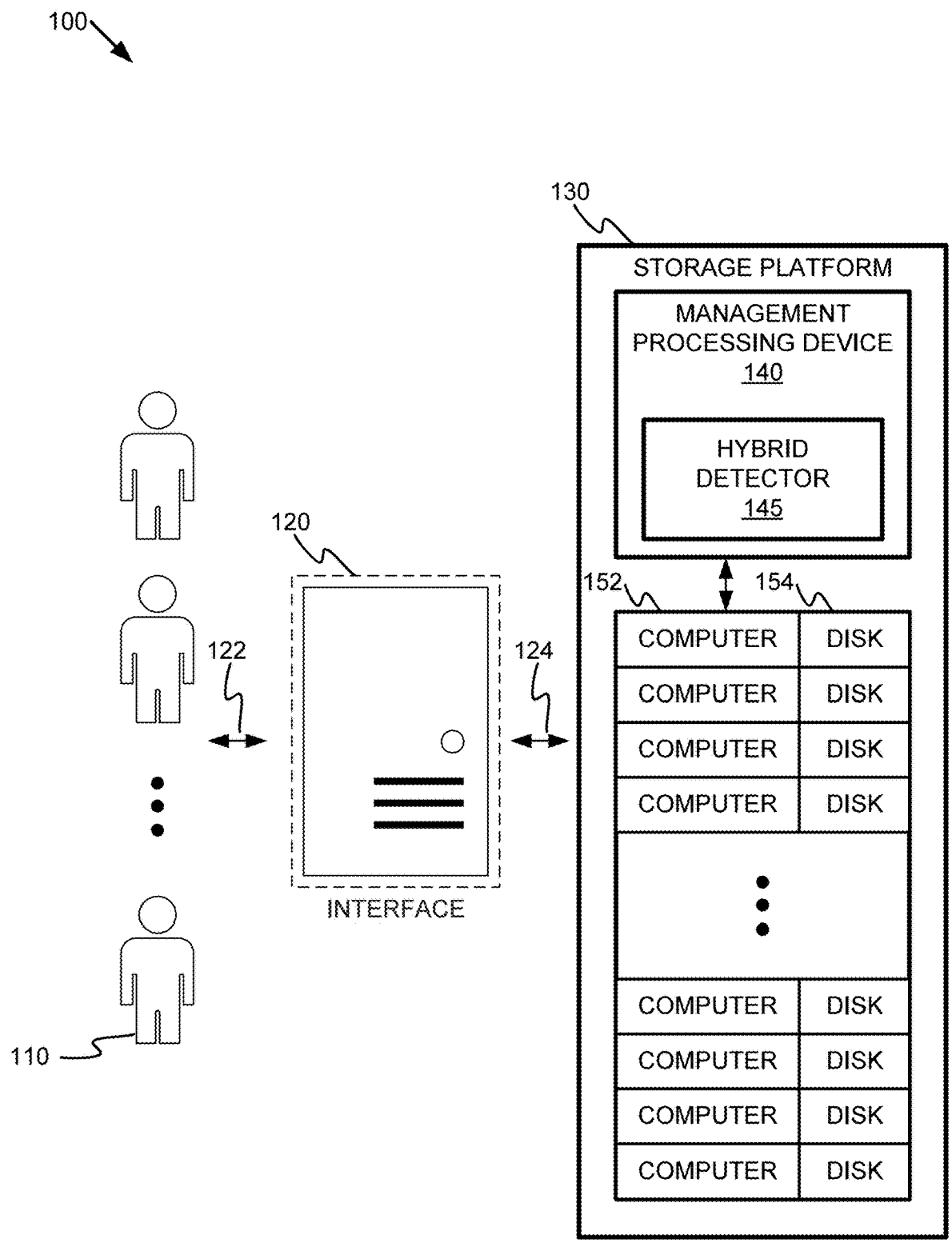
FIG. 1 depicts a high-level component diagram of an illustrative example of a client-storage relationship, in accordance with one or more aspects of the present disclosure.

The present disclosure provides techniques, processes, devices, and systems for storing and scanning data to detect attacks, such as ransomware attacks. Ransomware attacks encrypt data without the data owners' consent and ask for ransom in exchange for decryption of the encrypted data. The data owners often are not aware of the attack, and when the ransom is requested, the data owners may not be able to recover the original data from the encrypted copies, which may have completely replaced the original data. Such attacks may extend to backup copies of the data, including data stored in distributed platforms (e.g., a cloud network). Aspects of the present disclosure enable the detection of attacks early and perform remedial actions accordingly, while imposing minimal latency impact to the data storage process. For example, a hybrid data scan pipeline is presented herein for reducing response latency and increasing scanning accuracy of such attacks.

According to aspects of the present disclosure, a frontend of a storage platform receiving an incoming data object may scan a portion of the data object for a change of an entropy level. The scanning operation may be performed simultaneously with the reception operation. The portion scanned may be insignificant relative to the overall size of the data object. As such, the operations of the frontend would place an insignificant delay to the overall storage processing. Other portions of the data object will be processed at a backend of the storage platform. For example, subsequent to receiving the data object, a change of entropy level of the other portions is scanned for detecting ransomware attacks.

In some cases, the storage platform may include a block, file, and object storage operating on industry-standard servers and internet protocols, such as CEPH™ storage or Red Hat™ Ceph Storage. The storage platform performs distributed operation without a single point of failure and is scalable to large data size levels. The storage platform may replicate data to improve fault tolerance. The storage platform enables disaster recovery and data redundancy through techniques such as replication, erasure coding, snapshots, and storage cloning. As such, the storage platform may self-restore, self-manage, and minimize administrative time and operational costs. As such, the storage platform itself, when not employing defense mechanisms against ransomware attacks, may also replicate, backup, update, or store encrypted data that are subject to future ransom attacks.

Given the scalability of such storage platforms, the longer the attacked data are allowed to propagate in the storage platforms, the more difficult restoring such data may be, if possible. Therefore, timely detection of malicious encryption is desired. However, such detection operation, often requiring substantial computation resources and time, could go against the objective of providing instant responses (e.g., low latencies) to clients and users. Balancing both objectives of early detection and accurate determination, the present disclosure provides a hybrid data scan pipeline that reduces response latency and increases ransomware attack scanning accuracy. For example, a hybrid detector can scan an insignificant portion of an incoming data object and provide preliminary warnings when substantial entropy change has been detected. The hybrid detector then scans the remaining portion of the incoming data object in the backend, without time constraints and with improved accuracy. In some cases, the hybrid detector may further improve the detection accuracy by employing external validation. As such, both timeliness and accuracy can be achieved.

FIG. 1 depicts a high-level component diagram of an illustrative example of a client-storage relationship 100, in accordance with one or more aspects of the present disclosure. As shown, one or more clients 110 may access the storage platform 130 via the interface 120. The connections 122 and 124 may include one or more wired or wireless networks or connections (e.g., cellular, world-wide-web, local area network, etc.). The one or more clients 110 may transmit data objects to the storage platform 130 for storage. The interface 120 may include a user interface, such as a graphical user interface on a computer (e.g., a desktop or notebook computer, a tablet, a smart phone, etc.) The storage platform 130 includes a management processing device 140 and one or more distributed storage hardware respectively including a computer 152 and a corresponding storage medium 154. The management processing device 140 includes a hybrid detector 145 for scanning incoming data object to prevent ransomware attacks.

According to aspects of the present disclosure, the hybrid detector 145 may include a memory and a processing device coupled to the memory. The processing device and the memory may be configured to receive, at the storage platform 130 (such as a frontend thereof), an incoming object having a first segment and a second segment. The processing device and the memory may be configured to scan, simultaneous with the receiving, the first segment of the incoming object for a change of an entropy level of the first segment. For example, the first segment of the object may be the first four kilobytes (4 kB) or a 4 kB segment at a random position within the object. The actual size of the first segment, though demonstrated as 4 kB in the current example, may be of any practical values (e.g., in terms of actual sizes or percentages) specific to the computational capacity of the storage platform 130, the type of object, or the needs of the one or more clients 110.

In some cases, the scanning of the first segment may result in detection of suspicious attacks on the object based on the change of the entropy level of the first segment. For example, because ransomware attacks are often based on unauthorized encryption of existing data, the entropy level of such encrypted data is much greater than the entropy level of a previous version, or similar reference data in general (e.g., other data of similar types, structure, etc.). For example, the change of the entropy level of the first segment may include a difference between the scanned entropy level and an entropy level of a reference data sample, or an entropy level of an earlier version of the data object.

The entropy level may measure randomness of subsequent bytes relative to preceding bytes in the data. For example, a text document often exhibits a low level of entropy, while an encrypted or compressed version of the same text document may exhibit an increased level of entropy. A threshold may be implemented to define at what difference the change of entropy level may trigger a detection of ransomware attack. The threshold value may vary with respect to different data types or structures, and/or expected ransomware strains.

Figure 4:
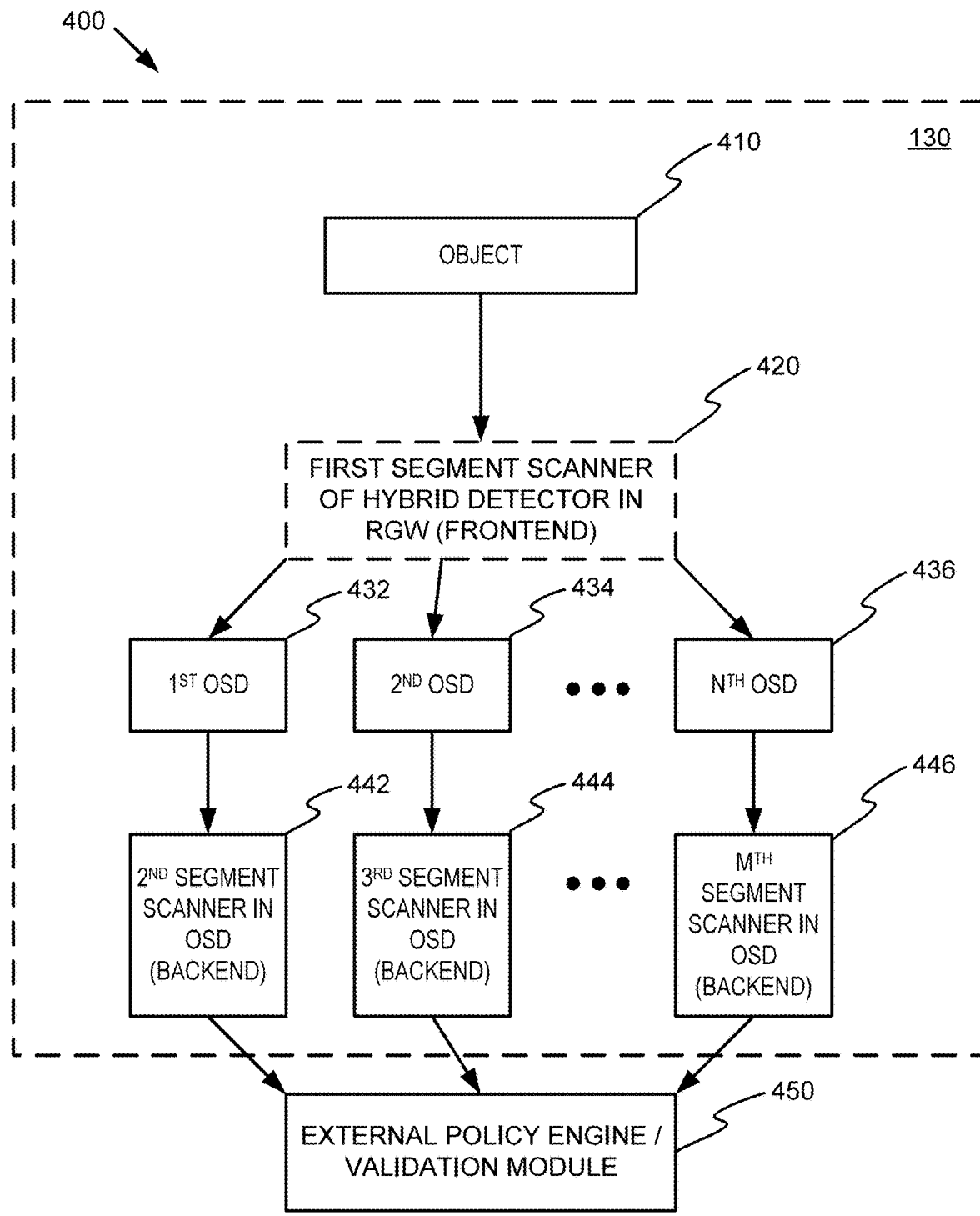
FIG. 4 illustrates an example block diagram of a hybrid data scan pipeline, in accordance with one or more aspects of the disclosure.

For example, various statistical tests may be performed to determine randomness of a digital file. The randomness may indicate whether the digital file has been encrypted. Example statistical tests may include Chi-square, arithmetic mean, Monte Carlo, serial byte correlation coefficient, Shannon entropy, and the like. According to aspects of the present disclosure, entropy scanning, such as Shannon entropy scanning, may be employed to determine randomness of the digital file, and potential associated ransomware attacks. Entropy is a measure of a given uncertainty level at the input. The level of uncertainty may indicate the amount of information contained within each byte. As such, the entropy level of an encrypted object is higher than the entropy level of a previous version of the unencrypted object or a reference object of similar type (e.g., file type, such as text, image, etc.). A change of the entropy level exceeding a threshold value may thus indicate a ransomware attack, which may further be verified and validated (e.g., by a policy engine or validation module, as illustrated in FIG. 4).

The scanning of the first segment is a timely, but preliminary, initial phase of attack detection. This operation enables the storage platform 130 to provide warnings to users as early as possible. Such warnings, even though often correct, may further benefit from verification and/or validation. As such, the processor and memory of the hybrid detector 145 may process, at a backend of the storage platform 130, the incoming object for storage and scan, at the backend subsequent to receiving the incoming object at the frontend, the second segment of the incoming object for a change of an entropy level of the second segment. Although the scanning of the second segment is performed at a subsequent time to the scanning of the first segment, as the backend may be more computationally powerful than the frontend, the scanning of the second segment (e.g., the remaining segments of the incoming object) may be completed in a timely and efficient manner. In some cases, the scanning of the second segment of the incoming object is simultaneous with the processing (e.g., assigning, sorting, storing, replicating, etc.) the incoming object for storage at the backend of the storage platform.

Similar to the scanning of the first segment, scanning of the second segment may detect or identify ransomware attacks when the change of the entropy level of the second segment indicates an unauthorized encryption by a ransomware attack. Similar to that of the first segment, the change of the entropy level of the second segment may include a difference between the scanned entropy level and an entropy level of a reference data sample, or an entropy level of an earlier version of the data object.

According to aspects of the present disclosure, the hybrid detector 145 may report a warning upon detecting the change of the entropy level of the first segment exceeding a threshold indicating a ransomware encryption. The hybrid detector 145 may further generate a metadata record of the scanning of the second segment, regardless whether the change of the entropy level of the second segment exceeds the threshold. In some cases, upon detecting the change of the entropy level of the second segment exceeding the threshold, the hybrid detector 145 may provide the generated metadata record to an external policy engine (as shown in FIG. 4) for verification or validation of the ransomware encryption. For example, the scanning of the second segment may verify the initial detection as a result of scanning of the first segment, and sending the metadata record to the external policy engine may validate the scanning determination on both the first and the second segments, such as to reduce or avoid erroneous detections when the change of entropy does not mean a ransomware attack.

According to aspects of the present disclosure, the second segment of the incoming object may include a number of parallel segments processed by two or more object storage devices or daemons(OSDs), as further discussed below. In aspects, the storage platform 130 may implement object storage on a single distributed computer cluster and provide integrated interfaces for at least one of: object-level, block-level, or file-level storage.

Although the above example uses an incoming object as an example, similar techniques may apply to block or file level storage as well. In some cases, the frontend of the storage platform 130 may include a presentation layer or protocol of a reliable, autonomous, distributed object store (RADOS) gateway (RGW); and the backend may include a data access layer or storage of an OSD, as shown in FIGS. 2 and 3.

Figure 2:
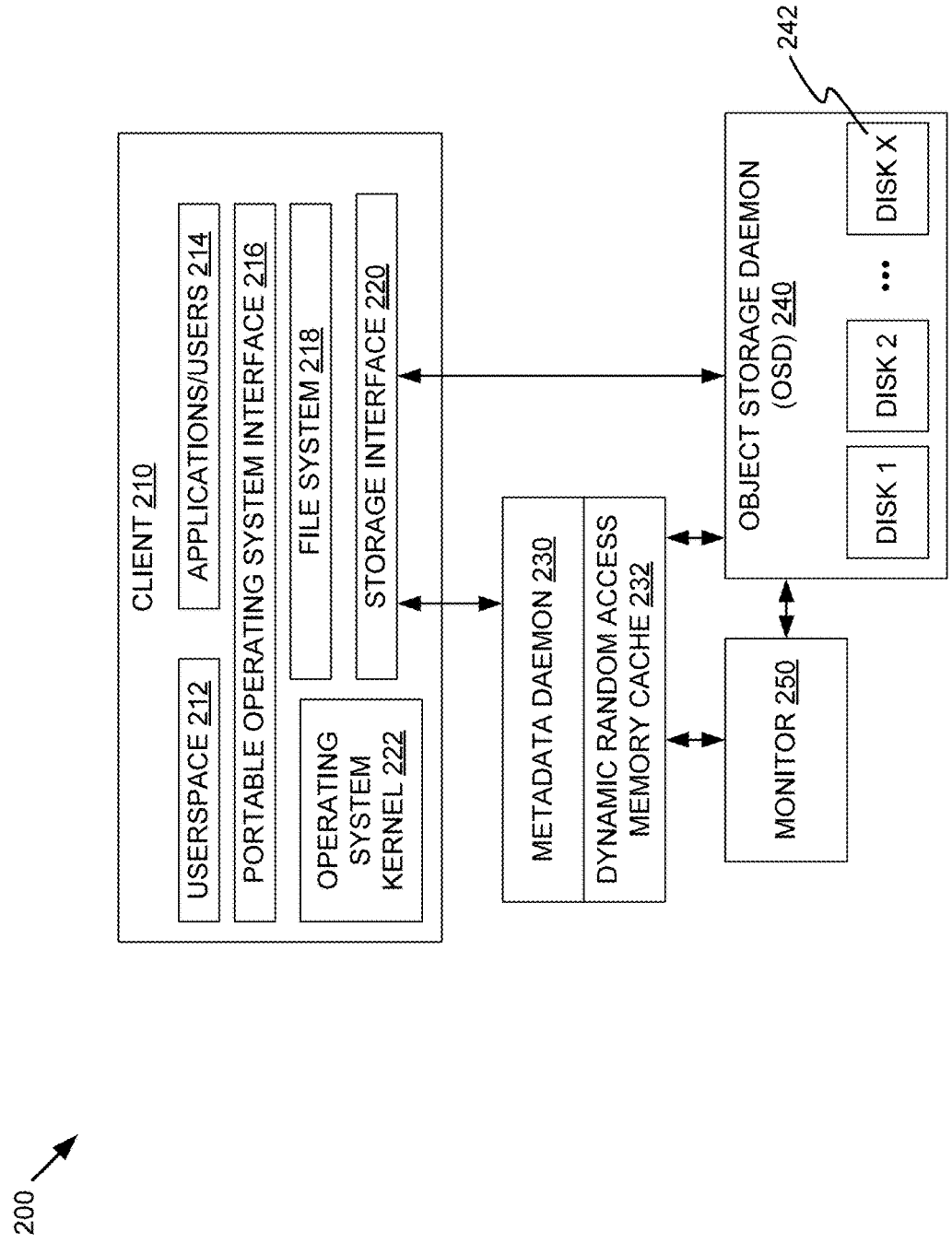
FIG. 2 is a schematic diagram illustrating an example client data handling structure, in accordance with one or more aspects of the present disclosure.
Figure 3:
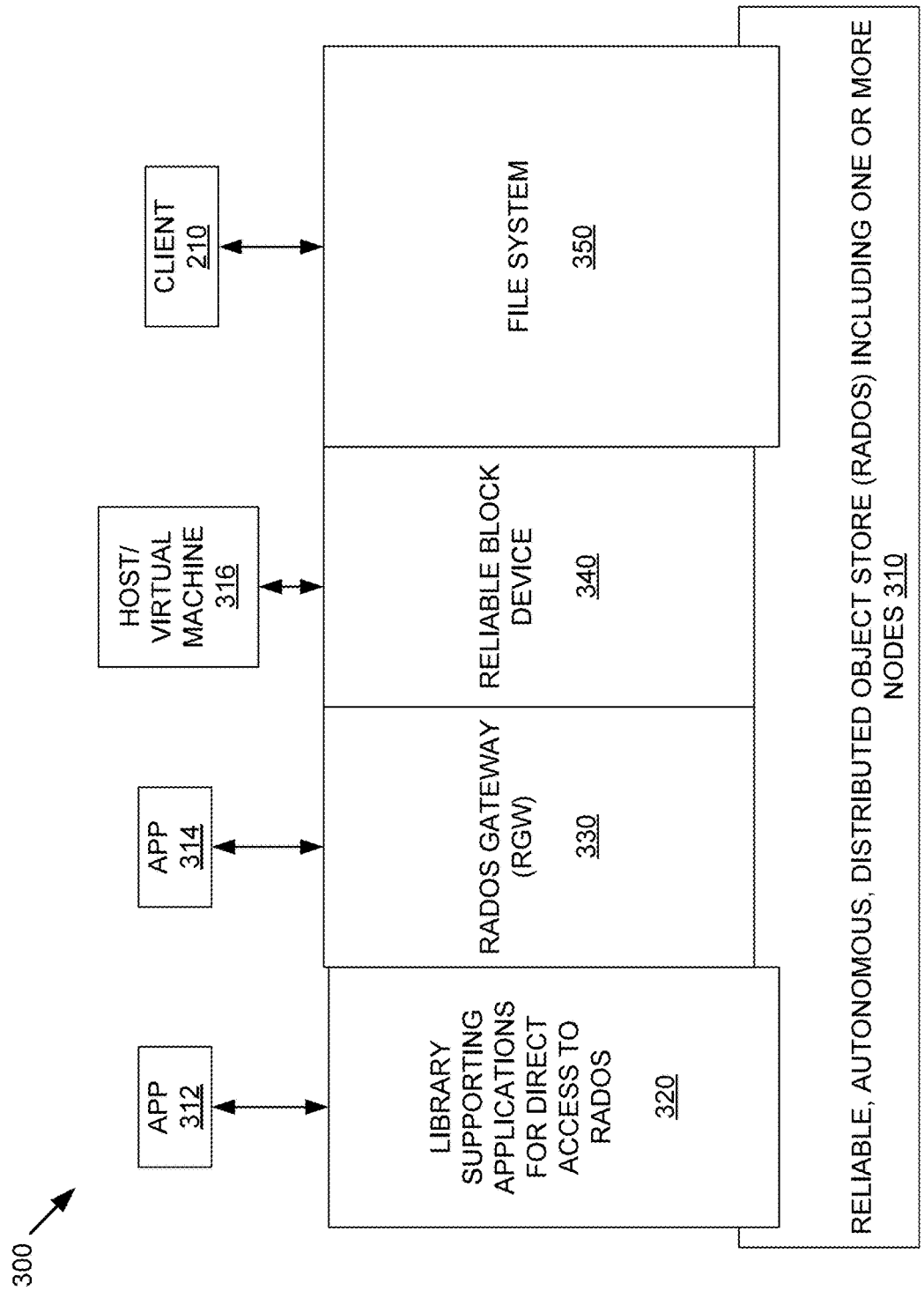
FIG. 3 depicts a high-level component diagram of an illustrative example of data access relationships, in accordance with one or more aspects of the disclosure.

FIG. 2 is a schematic diagram illustrating an example client data handling structure 200, in accordance with one or more aspects of the present disclosure. As shown, the client 210 may exchange information with the metadata daemon 230 and the object storage daemon (OSD) 240. The client 210 may include any data user(s). The metadata daemon 230 may include any metadata server(s) that may cache and synchronize distributed data. The OSD 240 may include any object storage cluster(s) that stores both metadata and data as objects. The metadata daemon 230 and the OSD 240 may both communicate with the monitor 250, which may include any cluster monitor(s) that oversees activities in the OSD 240 and the metadata daemon 230. The OSD 240 includes one or more disks 242 for storing data objects and the like. The metadata daemon 230 includes the dynamic random access memory cache 232 for exchanging information with the OSD 240 and the monitor 250.

The client 210 includes user space 212, applications or users 214, a portable operating system interface 216, a file system 218, an operating system kernel 222, and a storage interface 220. In aspects, the client 210 may identify locations of data using the metadata daemon 230 via the storage interface 220. The metadata daemon 230 may manage the location of data (e.g., including identifying new locations of incoming data) and manage functions such as opening, closing, and renaming. The OSD 240 may manage reading and writing of the incoming data. In general, the monitor 250 may track the health of the OSD 240 and the disks 242 therein. The monitor 250 may maintain a map of information for each component (e.g., in a cluster map). The OSD 240 stores data for the client 210 in one or more physical disks 242, which may take on any form, such as hard drives, solid state drives, or the like. The metadata daemon 230 may record file hierarchy and store metadata for the file system 218. In some cases, the client 210 may provide access to servers via the storage interface 220. The client data handling structure 200 may be managed by a management layer (e.g., a control layer over the OSD 240, the metadata daemon 230, and the monitor 250) for data replication, failure detection, attack detection, recovery, and/or migration, as shown in FIG. 3.

In aspects, the client 210 may provide its user a view of data above the underlying operations with the metadata daemon 230, the OSD 240, and the monitor 250. For example, the user may see a mount point to perform standard file operations. In some cases, the file system 218 and the storage interface 220 may be implemented via the operating system kernel 222, such as a Linux kernel. The file system 218 intelligence may be distributed to multiple nodes of the management layer, for large scale storage (e.g., by assigning an inode number (INO) to a file by the metadata daemon 230). A file with an assigned INO may be divided into multiple objects (e.g., based on the size of the file). Each object may be identified based on an object ID (OID) and assigned to a placement group based on a simple hash of the OD.

Objects may be stored in a conceptual container, which is mapped to object storage devices by pseudo-random mapping, without reliance on the metadata. The conceptual container may be identified by a placement group identifier (PGID). For example, the client 210 may retrieve stored objects from the OSD 240 via the storage interface 220 based on the pseudo-random mapping and not based on the metadata stored in the metadata daemon 230. The use of pseudo-random mapping allows for reduction of storage overhead and simplification of data distribution and lookup. In some cases, a cluster map may be used to represent the devices (e.g., disks 242) representing a storage cluster. As such, any object may be located (or allocated) based on PGID and the corresponding cluster map.

FIG. 3 depicts a high-level component diagram 300 of an illustrative example of data access relationships, in accordance with one or more aspects of the disclosure. The component diagram 300 depicts relations between components of a storage platform, such as the storage platform 130 of FIG. 1. As shown, the component diagram 300 includes a reliable, autonomous, distributed object store (RADOS) 310, which includes one or more nodes. The RADOS 310 may operate as the management layer as aforementioned in FIG. 2. The RADOS 310 may manage and store objects irrespective of data types and ensure data consistency. The RADOS 310 may be directly accessed by the library 320, which responds to requests by the application 312. The library 320 provides a native interface for RADOS 310 with little overhead (e.g., hypertext transfer protocol).

The RADOS Gateway (RGW) 330 may provide object storage services, by using an RGW library and the library 320. The RGW 330 enables applications 314 to establish connections with object storage (e.g., OSD 240 of FIG. 2). The applications 314 may be the same as the application 312, or different when the applications 314 do not have access to the library 320. As such, the RGW 330 may also be referred to as object gateway. The reliable block device 340 includes a reliable and fully distributed block device for allowing access by the host or virtual machine 316. The reliable block device 340 may be used for block storage. The file system 350 includes a portable operating system interface compliant distributed file system. The client 210 may use services provided by the file system 350 to access objects stored in the RADOS 310.

FIG. 4 illustrates an example block diagram of a hybrid data scan pipeline 400, in accordance with one or more aspects of the disclosure. The hybrid data scan pipeline 400 addresses the latency and overload issues that a storage platform may face when attempting to scan for ransomware attacks when performing storage operations. As shown, the hybrid data scan pipeline 400 uses both the frontend 420 (e.g., an RGW, such as the RGW 330 of FIG. 3) and the backend scanners 442, 444, or 446 (e.g., within OSDs, such as the OSD 240 of FIG. 2, or OSDs 432, 434, . . . , and 436) to balance a low response latency with accuracy (e.g., without ignoring the scanning of all related objects). In some cases, the backend scanners 442, 444, and 446 may be referred to as offline scanners because they may not be subject to latency or time constraints related to the storage operation. For example, the backend scanners 442, 444, 446 may have unlimited time to scan the remaining segments.

The frontend 420 may generally include a presentation layer and the OSDs (or backends) 432, 434, 436 may generally include a data access layer of the storage platform 130, or the corresponding physical infrastructure or hardware. In general architecture, multiple layers may be between the storage hardware (e.g., disks 242) and the client 210. The frontend may indicate an underlying component of an interface, and the backend may indicate components handling data storage (e.g., OSD 240, 432, 434, or 436). The hybrid detector 145 of FIG. 1 may include both the frontend 420 and one or more of the backend scanners 442, 444, . . . , and 446.

In the disclosed architecture, the frontend 420, a first segment scanner of a hybrid detector in RGW, scans a first segment of the incoming objects 410 inline, while the rest of the object segments are scanned at the backend scanners 442, 444, . . . 446, by other segment scanners in the OSD 240, 432, 434, or 436 offline. For example, the frontend 420 may first scan the first segment of the incoming data object 410, if the entropy change that satisfies certain criteria is detected, the frontend 420 reports a ransomware attack to a management layer (e.g., RADOS 310). The scanning of the first segment may be simultaneous to the receiving of the incoming object 410 at the frontend 420. That is, although FIG. 4 illustrates that the frontend 420 includes the first segment scanner in the same block, the first segment scanner may be separated but in parallel with the frontend 420 to perform scanning of the incoming object 410 when the frontend 420 receives the object 410.

The rest of the segments of the incoming object 410 are processed at the OSDs 432, 434, . . . and 436. For example, the storage operations are not interrupted even if warnings based on the detection of the first segments have been provided to the user (e.g., in case of false-positive). More importantly, in order to ensure detection accuracy (e.g., both to avoid false-positive detections and false-negative detections), the remaining segments are scanned (e.g., in parallel with one another) at the backend scanners 442, 444, . . . , and 446 to detect entropy change. For example, the detection may use the same algorithm as the frontend 420 in RGW for scanning the first segment. The detection result may be posted on the metadata associated with the segments.

As discussed above, inline scanning the first segment (e.g., a subset of the incoming object) by the frontend 420 may provide a timely and insightful detection result to a client or user. To ensure accuracy, the offline scanning performed by the backend scanners 442, 444, . . . , and 446 may verify the detection results. As such, both inline and offline scan results may be posted as metadata associated with the incoming object. Such a hybrid detection pipeline thus balances scanning efficiency to reduce processing latency and increase scanning accuracy by examining all segments in the object. The present disclosure therefore overcomes the bottleneck effect when traditional scanning that relied on RGW or frontend as the sole data scanner.

The metadata may be transmitted to a policy engine or validation module 450, which may be external to the storage platform 130, to determine whether detection based on the scanning of the segments is accurate. For example, an external policy engine collects the metadata and determines whether the entropy comparison has valid assumptions (e.g., in view of file types, ransomware strains, etc.). In some cases, the external policy engine 450 may be included in a metadata daemon, such as the metadata daemon 230 of FIG. 2, or included in a monitor, such as the monitor 250 of FIG. 2.

Figure 5:
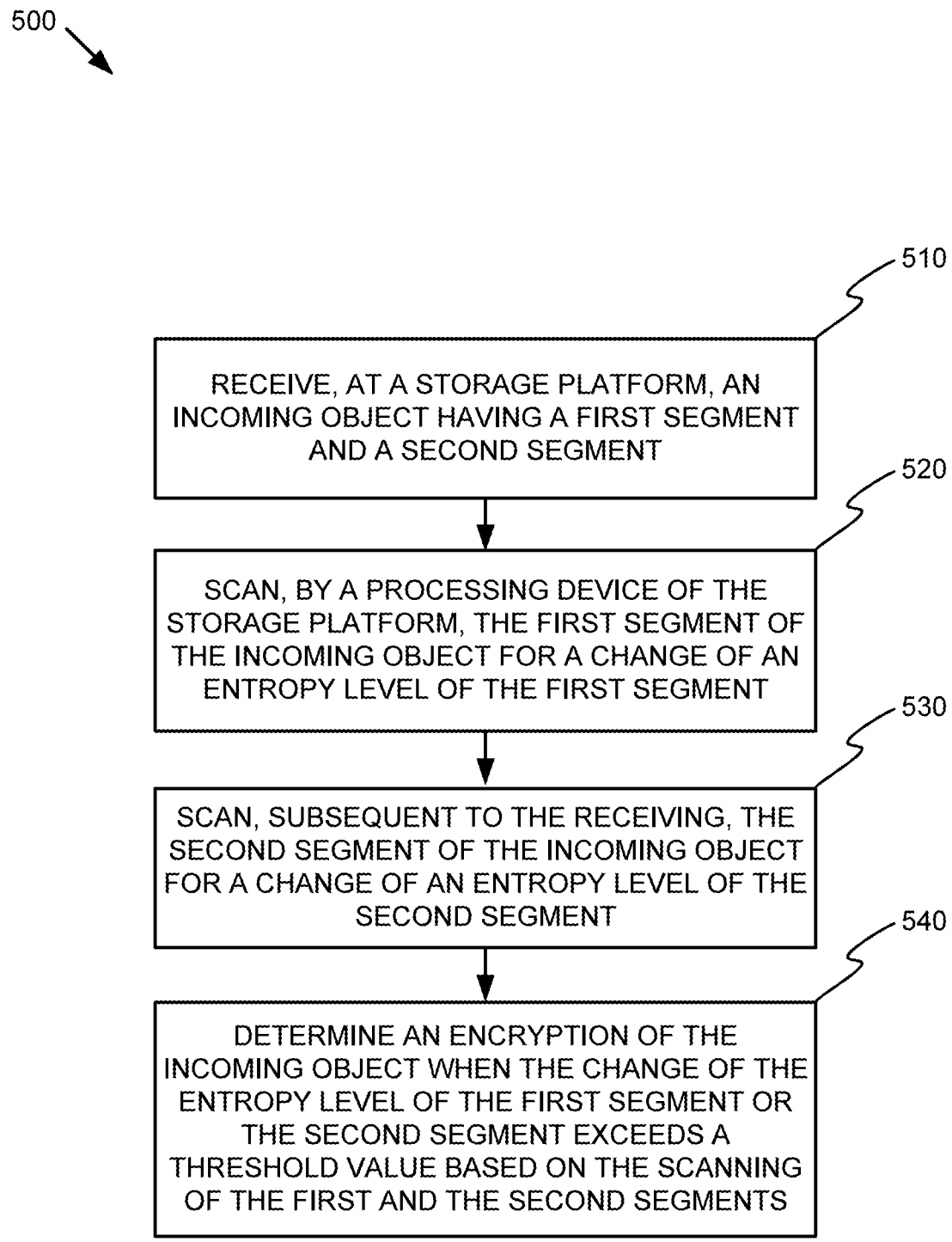
FIG. 5 is a flow diagram of a method of performing a hybrid data scanning, in accordance with one or more aspects of the disclosure.

FIG. 5 is a flow diagram of a method 500 of performing a hybrid attack scanning, such as in the storage platform 130 by the hybrid detector 145, in accordance with one or more aspects of the disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by hybrid detector 145 of FIG. 1, the frontend 420 and the backend scanners 442, 444, . . . , and 446 of FIG. 4.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at 510, an incoming object is received at a storage platform, such as a frontend of the storage platform. In some cases, the frontend may be a RGW, such as the RGW 330 as illustrated in FIG. 3. The incoming object may include a first segment and a second segment.

At 520, the storage platform may scan the first segment of the incoming object for a change of an entropy level of the first segment. In some cases, the scanning may be concurrent with the receiving the incoming object by the frontend of the storage platform. The concurrent scanning and receiving may be referred to as an inline operation, as the frontend of the storage platform is considered to be handling both tasks at substantially the same time (e.g., in real time, or with a controlled delay for synchronization with other operations). As such, the scanning of the first segment may impose minimal delay to the overall operation, causing negligible latency.

At 530, the storage platform may scan, subsequent to the receiving, the second segment of the incoming object for a change of an entropy level of the second segment. In some cases, the scanning is performed by a backend of the storage platform, such as the OSD 240, 432, 434, or 436. While scanning the second segment, the backend of the storage platform may also process the incoming object for storage. For example, the backend of the storage platform may provide object identification and assign cluster locations for replicating, distributing, or storing the incoming object. Scanning the second segment at the backend of the storage platform may be referred to as offline scanning, as little or less time constraints are placed to the completion of the scanning operation. The backend may thus perform a thorough scanning of the remaining segments of the objects. In some cases, the backend may include a number of OSDs that scan multiple subsets of the second segment, or scan the second segment along with other remaining segments, in parallel. In some cases, scanning the second segment of the incoming object is concurrent with the processing the incoming object for storage at the backend of the storage platform.

At 540, the storage platform may determine an encryption of the incoming object when the change of the entropy level of the first segment or the second segment exceeds a threshold value based on the scanning of the first and the second segments.

According to aspects of the present disclosure, the sharing platform may report a warning to a client or user upon detecting the change of the entropy level of the first segment exceeding a threshold indicating a ransomware encryption. For example, the threshold value may be based on a comparison with a reference entropy level of a similar type of unencrypted file, or a previous or similar version of the object (e.g., when updated or replaced). This early (almost real time) warning may enable the client to take immediate remedial actions, such as intervening the current operations or increasing priority of scanning the second segment of the incoming object.

According to aspects of the present disclosure, the storage platform may generate or compile a metadata record of the scanning of the second segment (sometimes also the first segment), regardless whether the change of the entropy level of the second segment exceeds the threshold that indicates a ransomware encryption. The metadata record may be provided to an external policy engine for separate validation of the scanning results. Thus, compiling the metadata record prepares for the situation where such validation becomes necessary. In some cases, upon detecting the change of entropy level of the second segment exceeding the threshold, the compiled metadata record is provided to an external policy engine for verification or validation of the ransomware encryption.

In aspects, the first segment of the incoming object includes an initial size (e.g., 4 kB) of the incoming object by order. The second segment includes a number of parallel segments processed by two or more object storage devices or daemons(OSDs).

In aspects, the storage platform implements object storage on a single distributed computer cluster and provides integrated interfaces for at least one of: object-level, block-level, or file-level storage. The frontend includes a presentation layer or protocol of a reliable, autonomous, distributed object store (RADOS) gateway (RGW). The backend includes a data access layer or storage of an object storage daemon (OSD). For example, the storage platform may include a Red Hat® Ceph® Storage platform.

Figure 6:
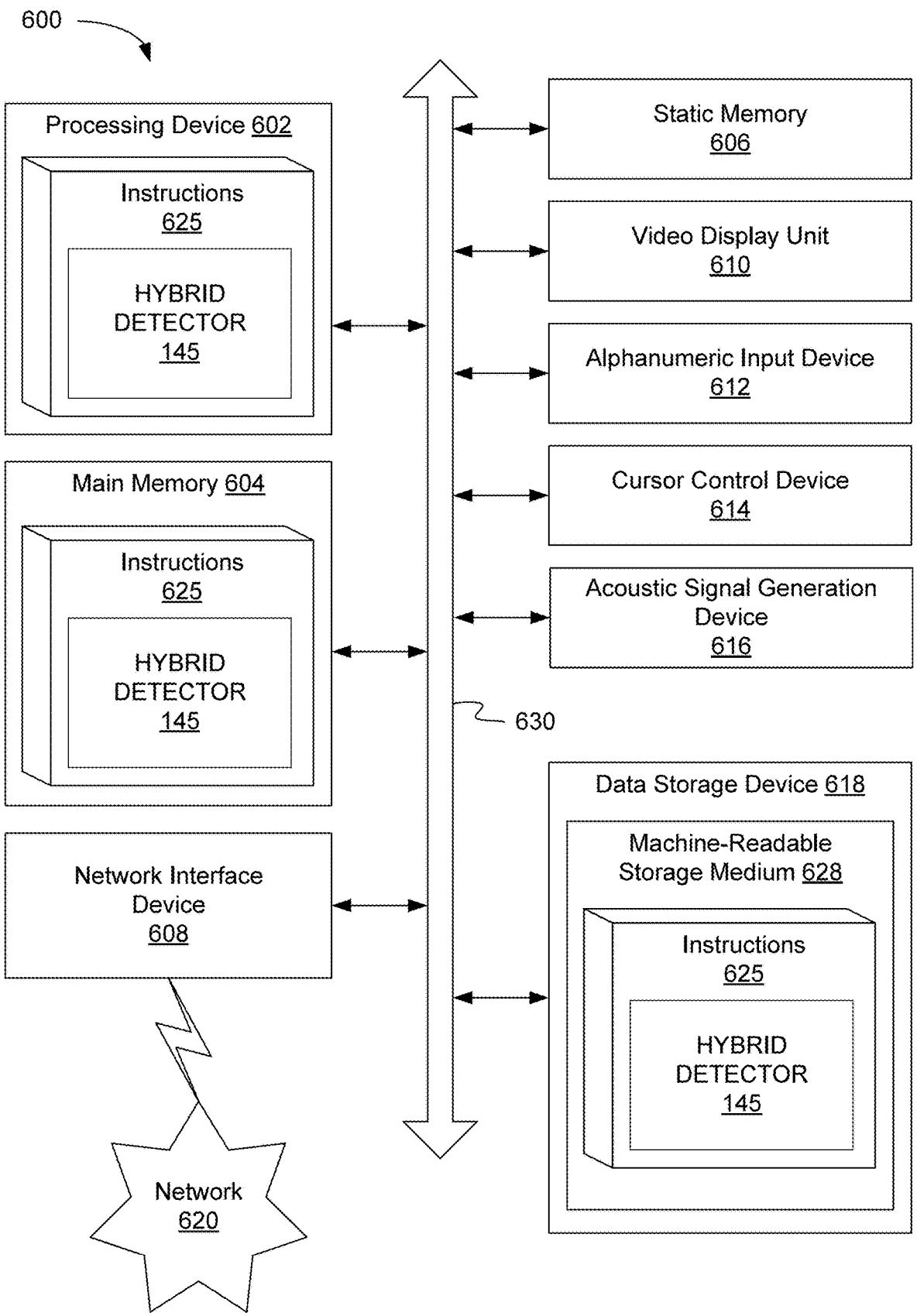
FIG. 6 is a block diagram of an example apparatus that may perform one or more of the operations described herein, in accordance with one or more aspects of the disclosure.

FIG. 6 is a block diagram of an example computing device 600 that may perform one or more of the operations described herein, in accordance with one or more aspects of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a non-volatile memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a hybrid entropy detection component, e.g., the hybrid detector 145 for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "determining," "scanning," "generating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving, at a frontend of a storage platform, an incoming object having a first segment and a second segment different from the first segment, the second segment including a number of parallel segments processed by two or more object storage daemons (OSDs);
   scanning inline, by a processing device of the frontend of the storage platform, the first segment of the incoming object for a change of an entropy level of the first segment, wherein the scanning inline does not scan the second segment of the incoming object;
   scanning offline, subsequent to the receiving and by a backend of the storage platform, the second segment of the incoming object for a change of an entropy level of the second segment, the backend being more computationally powerful than the frontend, wherein the scanning offline of the second segment comprises scanning, by the backend of the storage platform, the second segment of the incoming object during processing of the incoming object for storage at the backend of the storage platform; and
   determining an encryption of the incoming object when the change of the entropy level of the first segment or the second segment exceeds a threshold value based on the scanning inline of the first segment and the scanning offline of the second segment.

2. The method of claim 1, wherein the change of the entropy level of the first segment and the change of the entropy level of the second segment indicates an encryption by a ransomware to the incoming object.

3. The method of claim 1, further comprising:
   generating a warning upon detecting the change of the entropy level of the first segment exceeding the threshold value indicating a ransomware encryption; and
   generating a metadata record of the scanning offline of the second segment, regardless whether the change of the entropy level of the second segment exceeds the threshold value.

4. The method of claim 3, further comprising:
   responsive to detecting that the change of the entropy level of the second segment exceeds the threshold value, providing the generated metadata record to an external policy engine for verification of the ransomware encryption.

5. The method of claim 1, wherein the first segment comprises an initial subset of the incoming object.

6. The method of claim 1, wherein:
   the storage platform implements object storage on a distributed computer cluster and provides integrated interfaces for at least one of: object-level, block-level, or file-level storage;
   the frontend comprises a presentation layer or protocol of a reliable, autonomous, distributed object store (RADOS) gateway (RGW); and
   the backend comprises a data access layer or storage of the two or more OSDs.

7. A non-transitory computer-readable storage medium having instructions stored thereon that, when executed by a processing device, cause the processing device to:
   receive, at a frontend of a storage platform, an incoming object having a first segment and a second segment different from the first segment, the second segment including a number of parallel segments processed by two or more object storage daemons (OSDs);

scan inline, by the processing device of the frontend of the storage platform, the first segment of the incoming object for a change of an entropy level of the first segment, wherein the scanning inline does not scan the second segment of the incoming object;

scan offline, subsequent to the receiving and by a backend of the storage platform, the second segment of the incoming object for a change of an entropy level of the second segment, the backend being more computationally powerful than the frontend and configured to scan the second segment of the incoming object during processing of the incoming object for storage at the backend of the storage platform; and determine an encryption of the incoming object when the change of the entropy level of the first segment or the second segment exceeds a threshold value based on the scanning inline of the first segment and the scanning offline of the second segment.

8. The non-transitory computer-readable storage medium of claim 7, wherein the change of the entropy level of the first segment and the change of the entropy level of the second segment indicates an encryption by a ransomware to the incoming object.

9. The non-transitory computer-readable storage medium of claim 7, further comprises instructions stored thereon to cause the processing device to:

generate a warning upon detecting the change of the entropy level of the first segment exceeding the threshold value indicating a ransomware encryption; and generate a metadata record of the scanning offline of the second segment, regardless whether the change of the entropy level of the second segment exceeds the threshold value.

10. The non-transitory computer-readable storage medium of claim 9, further comprises instructions stored thereon to cause the processing device to:

responsive to detecting that the change of the entropy level of the second segment exceeds the threshold value, provide the generated metadata record to an external policy engine for verification of the ransomware encryption.

11. The non-transitory computer-readable storage medium of claim 7, wherein the first segment comprises an initial subset of the incoming object.

12. The non-transitory computer-readable storage medium of claim 7, wherein:

the storage platform implements object storage on a distributed computer cluster and provides integrated interfaces for at least one of: object-level, block-level, or file-level storage;

the frontend comprises a presentation layer or protocol of a reliable, autonomous, distributed object store (RADOS) gateway (RGW); and the backend comprises a data access layer or storage of the two or more OSDs.

13. A system comprising:

a memory; and a processing device coupled to the memory, to:

receive, at a frontend of a storage platform, an incoming object having a first segment and a second segment different from the first segment, the second segment including a number of parallel segments processed by two or more object storage daemons (OSDs);

scan inline, by the processing device of the frontend, the first segment of the incoming object for a change of an entropy level of the first segment, wherein the scanning inline does not scan the second segment of the incoming object;

scan offline, subsequent to the receiving and by a backend of the storage platform, the second segment of the incoming object for a change of an entropy level of the second segment, the backend being more computationally powerful than the frontend, wherein the scanning offline of the second segment comprises scanning, by the backend of the storage platform, the second segment of the incoming object during processing of the incoming object for storage at the backend of the storage platform; and determine an encryption of the incoming object when the change of the entropy level of the first segment or the second segment exceeds a threshold value based on the scanning inline of the first segment and the scanning offline of the second segment.

14. The system of claim 13, wherein the change of the entropy level of the first segment and the change of the entropy level of the second segment indicates an encryption by a ransomware to the incoming object.

15. The system of claim 13, the processing device and the memory further to:

generate a warning upon detecting the change of the entropy level of the first segment exceeding the threshold value indicating a ransomware encryption; and generate a metadata record of the scanning offline of the second segment, regardless whether the change of the entropy level of the second segment exceeds the threshold value.

16. The system of claim 15, the processing device and the memory further to:

responsive to detecting that the change of the entropy level of the second segment exceeds the threshold value, provide the generated metadata record to an external policy engine for verification of the ransomware encryption.

17. The system of claim 13, wherein the first segment comprises an initial subset of the incoming object.

* * * * *